(12) United States Patent
Koerner

(10) Patent No.: US 6,505,595 B1
(45) Date of Patent: Jan. 14, 2003

(54) METHOD AND APPARATUS FOR CONTROLLING IGNITION DURING ENGINE STARTUP

(75) Inventor: Scott A. Koerner, Kenosha, WI (US)

(73) Assignee: Bombardier Motor Corporation of America, Grant, FL (US)

( * ) Notice: Subject to any disclaimer, the term of this patent is extended or adjusted under 35 U.S.C. 154(b) by 35 days.

(21) Appl. No.: 09/657,743

(22) Filed: Sep. 8, 2000

(51) Int. Cl.$^7$ ............................................... F02N 17/00
(52) U.S. Cl. ................................ 123/179.5; 123/406.54
(58) Field of Search ........................ 123/179.5, 406.53, 123/406.54

(56) References Cited

U.S. PATENT DOCUMENTS

| | | | |
|---|---|---|---|
| 4,873,958 A | | 10/1989 | Abe |
| 4,982,712 A | * | 1/1991 | Abe ........................ 123/424 |
| 5,069,174 A | * | 12/1991 | Kanno ..................... 123/179.16 |
| 5,165,271 A | * | 11/1992 | Stepper et al. ............. 123/617 |
| 5,325,710 A | | 7/1994 | Morikawa |
| 5,419,291 A | | 5/1995 | Kimata et al. ........... 123/179.16 |
| 5,467,753 A | * | 11/1995 | Takaoka et al. ............. 123/418 |
| 5,523,679 A | | 6/1996 | Kalb ......................... 324/165 |
| 5,805,450 A | | 9/1998 | Enlow et al. |
| 5,816,221 A | | 10/1998 | Krueger ..................... 123/491 |
| 5,977,764 A | | 11/1999 | Riedle et al. ................ 324/165 |
| 5,977,765 A | | 11/1999 | Gibson et al. ............... 324/165 |
| 6,034,525 A | | 3/2000 | Koerner et al. ............. 324/165 |
| 6,185,928 B1 | * | 2/2001 | Wallerand et al. ............ 60/274 |

FOREIGN PATENT DOCUMENTS

DE          31 15 237 A      11/1982

* cited by examiner

Primary Examiner—Willis R. Wolfe
Assistant Examiner—Johnny H. Hoang
(74) Attorney, Agent, or Firm—Ziolkowski Patent Solutions Group, LLC

(57) ABSTRACT

A method and apparatus are disclosed for controlling ignition timing during startup of a two-stroke internal combustion engine while avoiding ignition timing errors caused by engine speed fluctuations. A rotational component of the engine, such as a flywheel, bears a plurality of spaced indicator markers including a plurality of ignition triggering markers, each of which designates a position on the rotational component that is acceptable for triggering ignition in a respective cylinder of the engine. Ignition in each cylinder is triggered upon detecting the associated ignition triggering marker and without taking engine velocity into account. Ignition timing errors that could otherwise be introduced due to erroneous assumptions based on engine speed therefore are avoided. In order to optimize performance and reduce emissions after engine startup, the engine preferably incorporates measures to determine when a calculated engine velocity exceeds a threshold engine velocity and to change over to an ignition control scheme that takes calculated engine velocity into account after the calculated engine velocity exceeds the threshold engine velocity. The threshold engine velocity preferably is one that at least approaches a minimum idle speed of the engine. In the case of a 95–135 hp V-4 engine, the threshold velocity preferably is on the order 300 rpm to 400 rpm. The method is particularly beneficial in engines having less than six cylinders because those engines exhibit the most dramatic pressure and speed fluctuations during engine startup.

35 Claims, 3 Drawing Sheets

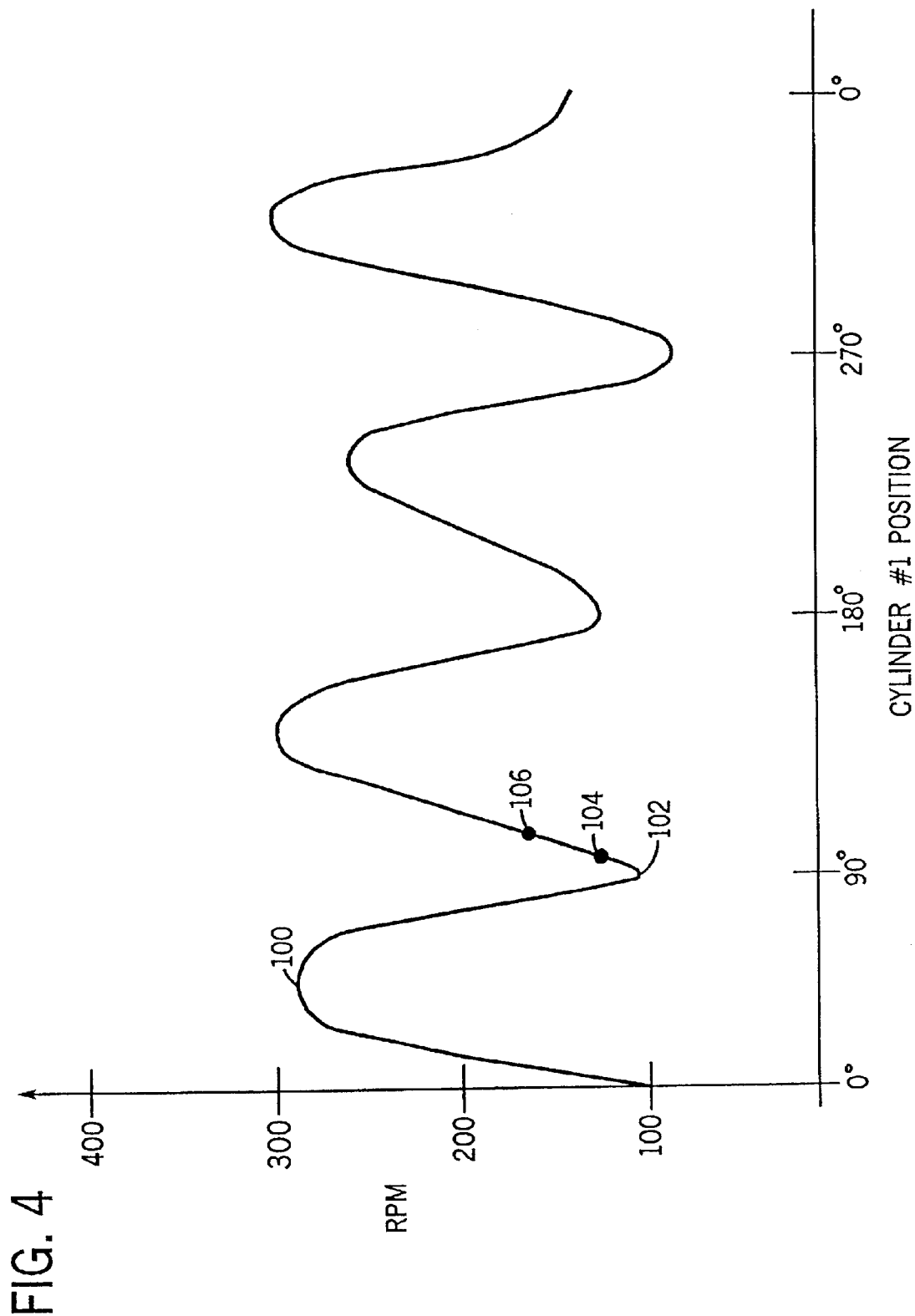

METHOD AND APPARATUS FOR CONTROLLING IGNITION DURING ENGINE STARTUP

BACKGROUND OF THE INVENTION

The present invention relates generally to internal combustion engines and, more particularly, relates to a method and apparatus for controlling ignition in a two-stroke engine during engine startup.

Two-stroke internal combustion engines are used in a variety of applications including outboard marine engines, snowmobiles, personal watercraft, snow blowers, and weed trimmers. Many modem two-stroke engines are electronically controlled to the extent that they have electronic ignition and possibly electronic fuel injection. These engines exhibit dramatically improved performance characteristics and reduced emissions than engines that have cam operated fueling and ignition systems. For instance, ignition timing of an electronically controlled engine can be controlled, sometimes on a cylinder-by-cylinder and cycle-by-cycle basis, so as to optimize performance and/or emission characteristics for a particular engine. This is in contrast to a cam-controlled engine, in which ignition timing for a particular cylinder is predetermined by the configuration of the cam controlling the ignition event.

Electronically controlled engines typically attempt to trigger ignition in a particular cylinder at a pre-calculated position of that cylinder, typically within a few degrees of top-dead-center (TDC). Ignition timing control is complicated by the fact that engine position is not monitored continuously but, instead, is detected periodically by detecting the rotation of a number (typically 16 to 24) of equally-spaced indicator markers on a flywheel or another rotational component of the engine past a sensor. However, optimal control of ignition timing often requires triggering of an ignition event at an engine rotational position between two adjacent indicator markers. This optimal ignition position cannot be sensed directly. Ignition timing therefore must be extrapolated from the time of detection of the last-detected indicator marker based upon the engine's current operational state. Specifically, after the ignition triggering marker (i.e., the indicator marker immediately preceding the optimal ignition position) is detected, an ignition delay period is calculated based on an assumption that the average engine speed at the ignition triggering marker will remain constant until the next indicator marker is detected. Average engine speed can be calculated by summing the number of indicator markers detected over a given period of time, multiplying that number by the known marker-to-marker spacing, and dividing the product by the elapsed time. Ignition then is triggered at the end of the calculated ignition delay period. Hence, if ignition in a particular cylinder is to be triggered 7° after TDC for that cylinder and the ignition triggering marker for that cylinder is at TDC, the ignition delay period can be calculated by dividing the angular distance between the ignition triggering marker and the desired ignition location (7° in this example) by the engine speed calculated upon the passage of the ignition triggering marker past the sensor.

Calculating ignition timing based on a speed-based extrapolation technique does not represent a problem during steady-state engine operation because engine speed fluctuates very little within a particular cycle. It has been discovered, however, that conventional extrapolation techniques can become ineffective for determining ignition timing during engine startup because engine speed can vary dramatically during the first few revolutions due to rather dramatic pressure fluctuations encountered by the rotating engine. Indeed, the instantaneous engine rotational velocity can vary as much as several hundred rpm or more during just 90° of engine revolution. Extrapolations based on average engine velocity therefore have low accuracy during startup. This problem is compounded by the fact that, during the first few revolutions of an engine's operation, the engine's control system has very little accumulated data on which to calculate an average engine speed. As a result, ignition delay calculations based on speed-based extrapolations can lead to an error in ignition timing that is so large that ignition of the fuel charge in the cylinder is degraded or even prevented. Hence, errors in ignition timing caused by speed fluctuations of an engine during startup can hinder or even prevent engine starting. These effects become more dramatic in engines having only a few cylinders because pressure and speed fluctuations tend to increase at least generally inversely with the number of cylinders in the engine. Hence, while the problem is noticeable in 6 cylinder engines, it becomes more critical in engines having 4 cylinders or less.

The need therefore has arisen to provide a method and apparatus for controlling ignition timing during startup of a two-stroke internal combustion engine while avoiding ignition timing errors caused by engine speed fluctuations.

SUMMARY OF THE INVENTION

Pursuant to the invention, a method of starting a two-stroke engine includes driving a rotational component of the engine to rotate, the component having a plurality of spaced indicator markers located thereon, while detecting rotation of indicator markers past a designated location. One of the indicator markers is an ignition triggering marker that designates a position on the component that is acceptable for triggering ignition in a cylinder of the engine. Ignition in the cylinder is triggered upon detecting the ignition triggering marker without taking engine velocity into account. Ignition timing errors that could be introduced due to erroneous assumptions concerning engine velocity therefore are avoided. The method is particularly beneficial in engines having less than six cylinders because those engines exhibit the most dramatic pressure and speed fluctuations during engine startup.

The method preferably additionally comprises monitoring engine velocity and determining when a calculated engine velocity exceeds a threshold engine velocity, and, after determining that the calculated engine velocity exceeds the threshold engine velocity, changing over to an ignition control scheme that takes calculated engine velocity into account when triggering ignition. The threshold engine velocity preferably is one that at least approaches a minimum idle speed of the engine. In the case of a 75 to 135 hp V-4 engine, the threshold velocity preferably is on the order 300 rpm to 400 rpm. The ignition control scheme implemented after switch-over preferably is one which, upon detection and identification of an ignition triggering marker (which is not necessarily the same triggering marker which was used prior to the switch-over, but which is calculated and can be any of the indicator markers provided the desired ignition event is to occur after the triggering marker passes but before the passage of the second indicator marker thereafter), (1) calculates an engine rotational velocity at the calculated ignition triggering marker, (2) calculates an ignition delay period based on the calculated engine velocity at the calculated ignition triggering marker, and (3) triggers ignition upon expiration of the calculated ignition delay period.

In accordance with another aspect of the invention, a two-stroke engine with improved start capability includes at least one cylinder, a computer, and a starter which, when actuated, drives a rotational component of the engine to rotate. The rotational component has a plurality of indicator markers thereon, one of which designates a position on the component that is acceptable for triggering ignition in a cylinder of the engine. The engine further comprises a monitor which monitors rotation of the rotational component, an electrically powered device which, when energized, triggers ignition in the cylinder, and a computer which is coupled to the monitor and to the powered device. The computer is operable, in conjunction with the monitor and the powered device, to detect rotation of the ignition triggering marker past a designated location, and to trigger ignition in the cylinder upon detecting the ignition triggering marker without taking engine velocity into account.

The engine may be a multi-cylinder engine, in which case the rotating component preferably is provided with a plurality of ignition triggering markers on the rotational component, each of which designates a position on the component that is acceptable for triggering ignition in a respective cylinder. In this case, the computer is further operable to repeat the detecting and triggering operations for each of the cylinders during startup.

Preferably, the computer is further operable to (1) calculate engine velocity, (2) determine when the calculated engine velocity exceeds a threshold engine velocity, and (3) after determining that the calculated engine velocity exceeds the threshold engine velocity, change over to an ignition control scheme that takes calculated engine velocity into account. If the optimum rotational position of the rotational component for triggering ignition in the cylinder is located between a calculated triggering marker and the second downstream indicator marker in the direction of component rotation, the ignition control scheme preferably is one which, for each cylinder, and upon detection of the calculated ignition triggering marker, (1) calculates an engine rotational velocity at the calculated ignition triggering marker, (2) determines an ignition delay period based on the calculated engine velocity, and (3) triggers ignition upon expiration of the calculated ignition delay period.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 4 is a graph illustrating a hypothetical relationship between engine speed and engine position during startup of a two-stroke engine.

DETAILED DESCRIPTION OF THE PREFERRED EMBODIMENT

Figure 1:
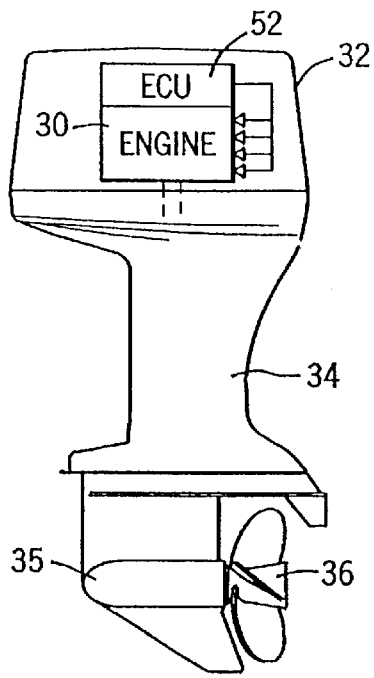
FIG. 1 is a partially schematic elevation view of an engine constructed in accordance with a preferred embodiment of the present invention.

The invention is applicable to virtually any two-stroke engine, and is particularly useful with engines having less than six cylinders. Applications for such engines include outboard marine engines and personal watercraft engines. One such engine 30, illustrated in FIG. 1, comprises an outboard two-stroke internal combustion engine. The engine 30 is housed in a powerhead 32 and supported on a mid-section 34 configured for mounting on the transom of a boat (not shown) in a conventional manner. The output shaft (not shown) of the engine 30 is coupled to a propeller 36 extending rearwardly of the mid-section 34 through a lower gearcase 35. The engine 30 is controlled by an integral computer (ECU) 52 detailed below. In the illustrated embodiment, the engine 30 is preferably a relatively large, V-4 engine having an output of about 75 hp to about 135 hp. The engine 30 is equipped with electric start as well as electronic fuel injection and electronic ignition. However, it should be understood that the invention is equally applicable to a variety of other two-stroke engines, including those having six or more cylinders and those having three or less cylinders. It is also applicable to engines lacking electric start or electronic fuel injection.

Figure 2:
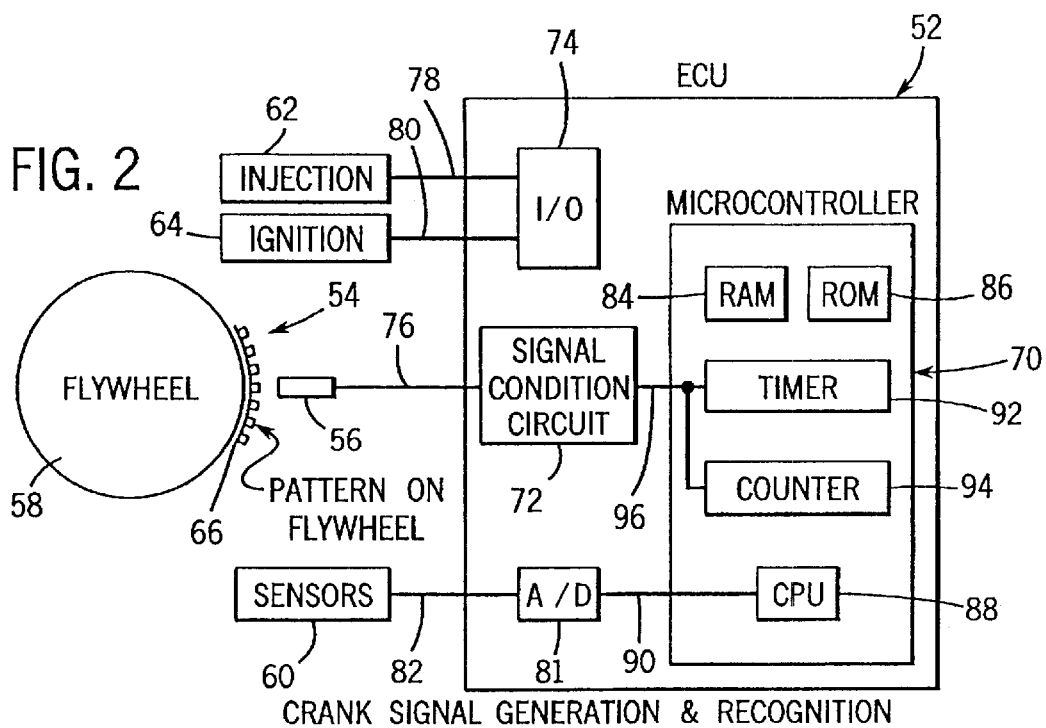
FIG. 2 is a schematic diagram of a control system for the engine of FIG. 1.

Referring now to FIG. 2, the engine 30 is controlled by a control system that includes the computer or ECU 52 and a crank position monitor 54. The computer 52 receives signals from the crank position monitor 54 and possibly other sensors 60 and transmits control signals to an electronic fuel injection system 62 and an electronic ignition system 64. The crank position monitor 54 includes (1) a plurality of markers 1–24 and A–C (FIG. 3) that are mounted circumferentially around a rotating component of the engine in an angularly-spaced apart relationship and (2) a detector 56 that detects movement of the markers past the detector 56. The rotating component bearing the markers 1–24 and A–C may comprise the crankshaft (not shown), the flywheel 58, or any other rotating engine component whose position is reflected directly or indirectly by the rotational position of the engine 30. In the illustrated embodiment, the rotational component is the engine's flywheel 58.

Figure 3:
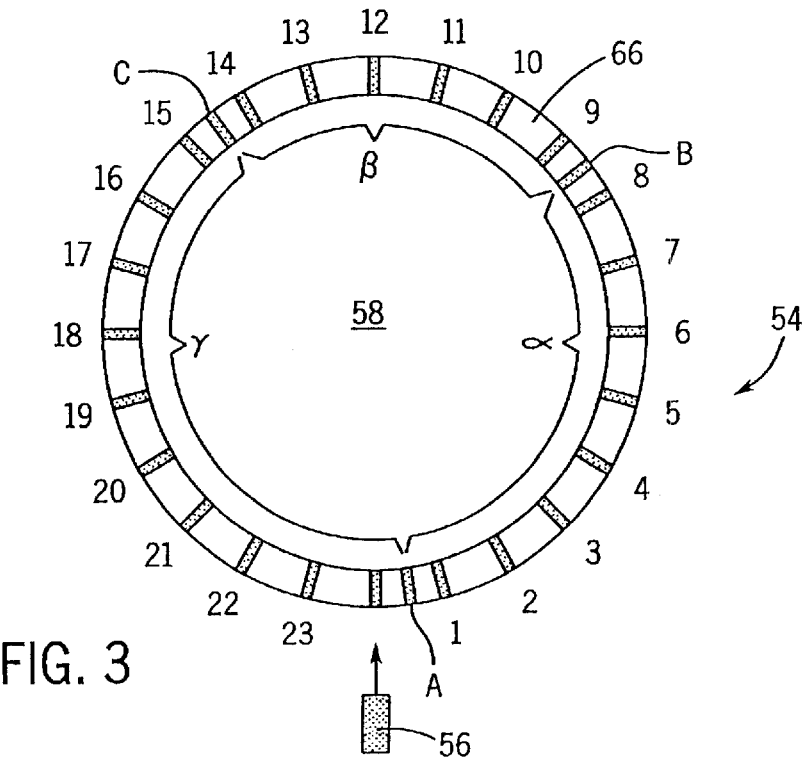
FIG. 3 is a schematic representation of a signal generating apparatus of the engine.

Referring to FIGS. 2 and 3, the markers 1–24 and A–C may comprise any devices detectable by an associated detector as the markers rotate past the detector. The illustrated markers comprise ferrous teeth mounted on a rotor 66. The rotor 66 is, in turn, mounted on the flywheel 58 so as to rotate therewith. The detector 56 may comprise any device capable of detecting the markers 1–24 and A–C. In the illustrated embodiment in which the markers comprise ferrous teeth, the detector 56 comprises a magnetic pick-up device such as a ferromagnetic transducer or a Hall effect sensor. With this type of monitor, rotation of the teeth 1–24 and A–C past the detector 56 generates magnetic pulses that are detected by the detector 56 to provide an indication of the markers' passage.

Referring again to FIG. 2, the computer 52 may comprise any programmable device capable of determining the engine's rotational position, velocity and, if necessary, direction of rotation based on signals from the detector 56 and of controlling the engine's fuel injection and/or ignition systems 62 and/or 64 accordingly. In the illustrated embodiment, the computer 52 comprises a programmable ECU that includes a microcontroller 70, a signal conditioning circuit 72, and an input/output device 74. The signal conditioning unit 72, which may comprise an analog-to-digital converter, is connected to the detector 56 by a transmission line 76 that converts the analog signals from the crank position monitor 54 to digital signals suitable for use by the computer 52. The input/output device 74 is coupled to the fuel injection and ignition systems 62 and 64 by respective transmissions lines 78 and 80. If additional sensors 60 are used to assist in the control of fuel injection and ignition, then the computer 52 may additionally comprise an analog-to-digital converter 81 that is coupled to the additional sensors 60 via a transmission line 82. The microcontroller 70 includes a pair of memory devices: a RAM 84 and a ROM 86, a CPU 88, a timer 92, and a counter 94. The CPU 88 is coupled to the A/D converter 81 by a transmission line 90. The timer 92 and counter 94 are connected to the signal conditioning circuit 72 by a transmission line 96 so as to count pulses generated by the detector 56 and the time between those pulses.

The data obtained from the monitor 54 can be compared with information stored in the ROM 86 regarding the spacings between and locations of the markers 1–24 and A–C to obtain information regarding the engine's current operation state, including its absolute rotational position, its velocity, and its direction of rotation. Specifically, referring to FIG. 3, the markers comprise a first plurality (24 in the illustrated embodiment) of indicator markers 1–24 and three additional indexing markers A–C disposed in an angularly spaced-apart relationship on the rotor 66. The indicator markers 1–24 are spaced at equal intervals of 15°. The indexing markers A–C are spaced non-uniformly around the rotor 66 so that the indexing marker B is spaced at an angle α from the indexing marker A and the indexing marker C is spaced at an angle β from the indexing marker B and an angle γ from the indexing marker A. In the illustrated embodiment, α equals 150°, β equals 90°, and γ equals 120°. Other angles may be used so long as α, β, and γ are all non-equal. The timer 92 and counter 94 of the microcontroller 70 are able to count the number of markers detected by the detector 56 and to measure the interval of time between each successive marker's passage. Because this time interval is constant for adjacent indicator markers but decreases by about half for the additional indexing markers, the computer 52 is able to detect the passage of an indexing marker by noting a decreased interval between pulses when compared to intervals between the indicator markers. The computer 52 can also obtain an indication of the angle between successively detected indexing markers A–C simply by counting the number of pulses between indexing markers A–C. Hence, in the illustrated embodiment, the computer 52 can obtain an indirect measurement of the angle (α) between the indexing markers A and B by counting the number of pulses (10) between those indexing markers. The counted number is then compared to known numbers stored in the ROM 86 to identify the second detected indexing marker B.

Once the second indexing marker is detected, the computer 52 can differentiate the first and second indexing markers A and B based on the known angular spacing between them and, accordingly, can ascertain the absolute rotational position of the engine 30. Engine rotation thereafter can be monitored by counting the detected indicator markers. For instance, engine displacement (and hence engine absolute position) can be determined by multiplying the number of counted indicator markers by the known angular spacing between them, and average engine speed over a particular period of time can be calculated by dividing the engine displacement over that period by the elapsed time. If counterrotation is a concern, measures may also be taken to check for counterrotation based on the detection of the third indexing marker C and to react accordingly if the engine is counterrotating.

Because the engine 30 has a relatively small number of cylinders (four on the illustrated embodiment) and a relatively high compression ratio, pressure fluctuations in the engine and resultant resistance to engine rotation fluctuate rather dramatically and unevenly until the engine starts and accelerates to a speed that at least approaches a normal idle speed. As a result, the rotational velocity of the engine 30 varies dramatically and unevenly during engine startup. This effect is illustrated by the curve 100 in FIG. 4, which illustrates that, for cylinder No. 1 of the V-4 engine 30, engine velocity fluctuates dramatically during the first engine revolution from as little as less than 100 rpm to as much as well over 300 rpm. The changes also vary from engine to engine or even from start to start due to changes in battery charge, engine temperature, etc. Ignition timing calculations extrapolated from calculated velocity therefore could be highly erroneous. For instance, in the illustrated theoretical embodiment in which the first detected TDC for cylinder No. 1 occurs relatively early in the engine cycle at a relatively low speed of about 100 rpm (see point 102 in FIG. 4). An extrapolation based on average engine velocity for the period leading up to TDC would overestimate the actual velocity of the engine at TDC and lead to premature ignition timing (compare point 104 in FIG. 4, which is the desired ignition timing, with the point 106, which is the actual ignition timing obtained by calculating ignition delay using a conventional extrapolation technique).

Pursuant to the invention, this potential problem is avoided by configuring the marker pattern on the flywheel 58 such that one of the indicator markers (e.g., indicator marker 6 in FIG. 3) is located at an acceptable ignition triggering position for Cylinder No. 1. Other indicator markers (e.g., markers 12, 18, and 24 in FIG. 3, respectively) are located at acceptable ignition triggering positions for the remaining cylinders. The acceptable ignition triggering position for each cylinder is preferably, but not necessarily, located at or very near the TDC position of that cylinder. Rather than attempting to calculate ideal injection timing based on potentially invalid assumptions concerning the engine's rotational velocity, the computer 52 simply supplies current to the driver 64 to trigger ignition in each cylinder upon detecting the ignition triggering marker corresponding to that cylinder. Ignition may be triggered either immediately or after a delay that is preset and invariable for each cylinder.

Figure 5:
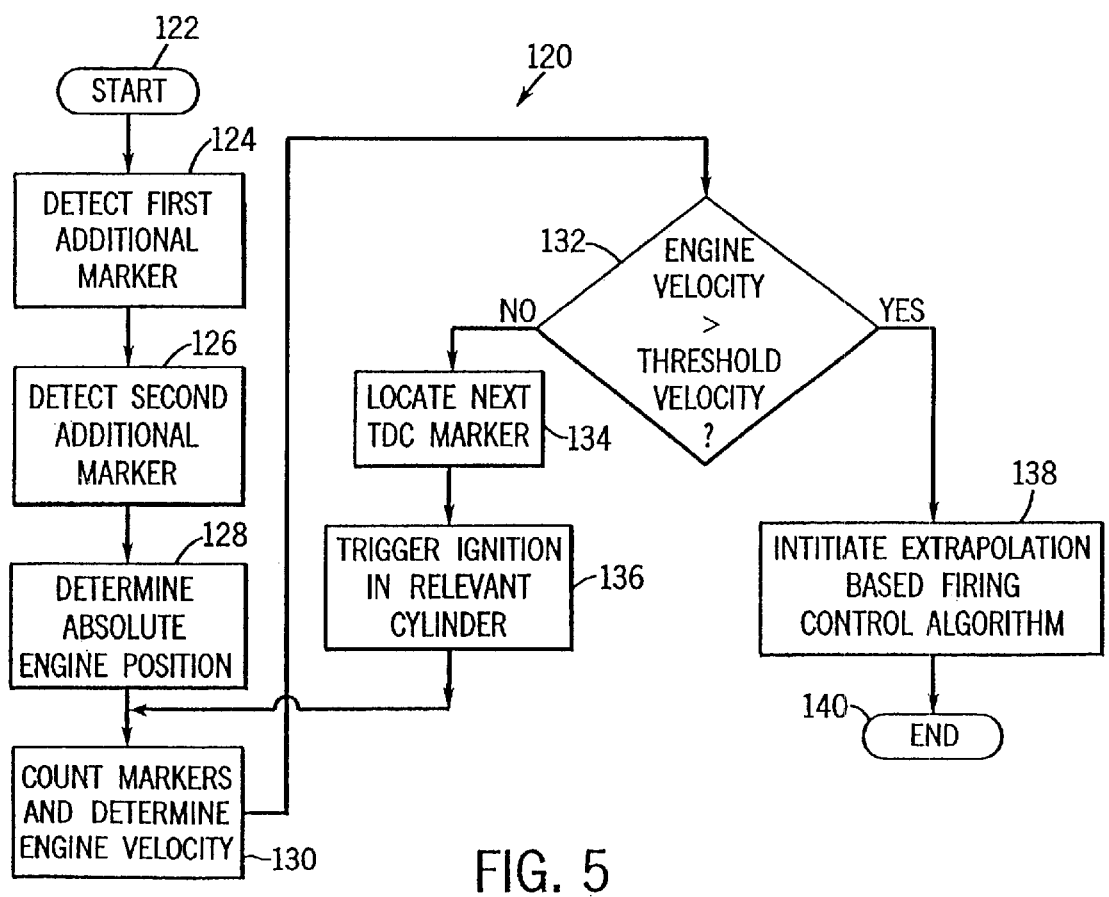
FIG. 5 is a flowchart of a routine implementable in accordance with the present invention in order to negate the effects of engine speed fluctuations on ignition timing during engine startup.

Referring to FIG. 5, the computer 52 implements the monitoring logic described above as part of a startup ignition timing control routine 120 that does not require extrapolation of engine position or ignition delay from engine speed. Upon electric or manual operation of a starter mechanism, the routine 120 proceeds from START at 122 and then detects the first indexing marker (e.g., marker B in FIG. 3) at 124. The routine 120 then resets the counter 94 and counts the indicator markers until the second indexing marker (e.g., marker A in FIG. 3) is detected at 126. The routine 120 then compares the counted number to the numbers corresponding to the three known angles (α, β, and γ). Based on this comparison, the routine 120 identifies the second detected marker as a specific indexing marker (marker A in this example) and determines the absolute rotational position of the engine 30 from the known position of the indexing marker at 128. The routine 120 then proceeds to 130, where it counts indicator markers as the engine 30 continues to rotate and, at each marker, determines the engine's instantaneous rotational position and its average rotational velocity.

Next, at 132, the routine 120 determines whether the engine's calculated average rotational velocity has increased to a sufficiently high value to permit ignition timing control to be implemented through a standard velocity-based extrapolation algorithm. This threshold velocity typically will be at or at least approaching the minimum idle RPM of the engine. In the V-4 engine 30 of this embodiment, the threshold average velocity should be between 300 and 400 rpm, preferably about 350 rpm. If the determined average engine velocity has not yet exceeded the threshold velocity, hence indicating that the engine 30 is still operating in startup mode, the routine 120 awaits the detection of the next downstream ignition triggering marker at 134. It then triggers ignition in the relevant cylinder at 136 without attempting to extrapolate actual engine position or to calculate an ignition delay based on potentially invalid assumptions concerning engine speed. Depending upon the location of the ignition triggering marker relative to TDC for that cylinder, ignition in the relevant cylinder may be triggered immediately upon detection of the triggering marker or after a designated, invariable delay. The routine 120 then returns to 130, where it detects the next indicator marker, updates the calculated average engine velocity, and again determines at 132 whether the average engine velocity exceeds the threshold velocity.

If the answer to the inquiry of 132 is YES, indicating that the calculated average engine velocity exceeds the threshold velocity, ignition control is changed-over to a conventional extrapolation-based firing control algorithm at 138. For instance, upon the detection of the next ignition triggering marker after a changeover to the conventional firing control algorithm, the computer 52 may calculate the average engine rotational velocity at that marker, then calculate an ignition delay period based on the calculated engine velocity, and then energize the driver 64 after that delay period to trigger ignition in the relevant cylinder. The ignition delay period typically will be extrapolated based on the assumption that the average engine velocity that is calculated upon detecting the ignition triggering marker will remain constant until the next indicator marker is detected and the average engine velocity updated.

It should be noted that ignition timing typically, but not necessarily, will be advanced after changeover from startup mode. To achieve the effect, the marker used to trigger ignition in a particular cylinder after changeover typically will not be the same marker used to trigger ignition during engine startup but, instead, will be a calculated marker located upstream of the TDC marker for that cylinder. In addition, the second marker thereafter located downstream of the triggering marker is used as the upper bound on the ignition triggering mechanism. After this switchover, the rotation 120 then proceeds to END at 140.

Many changes and modifications may be made to the invention without departing from the spirit thereof. Some of these changes are discussed above. The scope of other changes will become apparent from the appended claims.

I claim:

1. A method of sing a two-stroke engine comprising:
   (A) driving a rotational component of the engine to rotate, said component having a plurality of spaced indicator markers located thereon, wherein one of the indicator markers is an ignition triggering marker that designates a position on the rotational component that is acceptable for triggering ignition in a cylinder of the engine;
   (B) detecting rotation of an indicator marker past a designated location;
   (C) determining an average velocity of the engine;
   (D) determining if the average engine velocity exceeds a threshold velocity; and if not
   (E) detecting rotation of the ignition triggering marker past a designated location downstream of the indicator marker; and
   (F) triggering ignition in the cylinder upon detecting the ignition triggering marker without taking engine velocity into account.

2. The method of claim 1, wherein the engine is a multi-cylinder engine having a plurality of ignition triggering markers on the rotational component, each of which corresponds to a respective cylinder, and further comprising repeating the detecting and triggering steps for each of the cylinders.

3. The method of claim 2, wherein the engine has less than six cylinders.

4. The method of claim 2, wherein the engine is a four-cylinder engine.

5. The method of claim 1, further comprising monitoring engine velocity and determining when a calculated engine velocity exceeds a threshold engine velocity, and further comprising, after determining that the calculated engine velocity exceeds the threshold engine velocity, changing over to an ignition control scheme that takes calculated engine velocity into account when triggering ignition.

6. The method of claim 5, wherein the calculated engine velocity is an average velocity over a designated period of time.

7. The method of claim 5, wherein the threshold engine velocity is between 300 rpm and 400 rpm.

8. The method of claim 5, wherein an optimum rotational position of the rotational component for ignition of the cylinder is located between a calculated ignition triggering marker and another indicator marker located downstream of the calculated ignition triggering marker in the direction of component rotation, and wherein the ignition control scheme is one which, upon detection and identification of the ignition triggering marker, (1) calculates an engine velocity at the indicator marker, (2) calculates an ignition delay period based on the calculated engine velocity at the calculated ignition triggering marker, and (3) triggers ignition upon expiration of the calculated ignition delay period.

9. The method of claim 8, wherein the ignition control scheme calculates the ignition delay period by extrapolating the ignition delay period on an assumption that the calculated engine velocity at the ignition triggering marker will remain constant.

10. The method of claim 1, wherein the ignition triggering marker corresponds to a near-TDC position of the cylinder.

11. The method of claim 1, wherein the indicator markers are ferrous markers, and wherein the detecting step comprises detecting rotation of the ferrous markers past a magnetic pick-up device located adjacent the rotational component.

12. The method of claim 1, wherein the rotational component is a flywheel of the engine.

13. The method of claim 1, wherein the engine is an outboard marine engine.

14. A method of starting a two-stroke engine, the engine having N cylinders where N is no more than six, the method comprising:

(A) driving a rotational component of the engine to rotate, wherein a plurality of indicator markers are spaced equally about the rotational component, the indicator markers including N top-dead-center (TDC) markers, each of which designates at least a near-TDC position of a respective cylinder;

(B) detecting rotation of a first TDC marker past a sensor;

(C) triggering ignition in the first cylinder immediately upon detecting rotation of the first TDC marker past a sensor;

(D) repeating the steps (B) and (C) for each of the $2^{nd}$ through $N^{th}$ cylinders; and (E) during the steps (B) through (D), monitoring engine velocity, determining when an average engine velocity exceeds a threshold engine velocity, and, after determining that average engine velocity exceeds the threshold engine velocity, changing over to an ignition control scheme that triggers ignition in each cylinder after detection of a calculated indicator maker located downstream of the TDC marker for that cylinder in the direction of component rotation, taking a calculated engine velocity into account.

15. The method of claim 14, wherein the threshold engine velocity is between 300 rpm and 400 rpm.

16. The method of claim 15, wherein the threshold engine velocity is about 350 rpm.

17. The method of claim 14, wherein, for each cylinder, an optimum rotational position of the rotational component is located between the calculated indicator marker for that cylinder and another indicator marker located downstream of the calculated indicator marker in a direction of engine rotation, and wherein the ignition control scheme is one which, for each cylinder, (1) calculates an engine velocity at the corresponding calculated marker, (2) then calculates an ignition delay period based on the calculated engine velocity at the calculated marker, and (3) triggers ignition upon expiration of the calculated ignition delay period.

18. The method of claim 17, wherein, for each cylinder, the ignition control scheme calculates the ignition delay period by calculating an average engine velocity upon at the TDC marker for that cylinder and extrapolating the ignition delay period on the assumption that engine velocity will remain changed after detection of the TDC marker.

19. The method of claim 14, wherein the rotational component is a flywheel of the engine.

20. The method of claim 14, wherein the engine is an outboard marine engine.

21. A two-stroke engine comprising:

(A) at least one cylinder;

(B) a starter which, when actuated, drives a rotational component of the engine to rotate, wherein the rotational component has a plurality of indicator markers thereon, and wherein one of the indicator markers is an ignition triggering marker that designates a position on the rotational component that is acceptable for triggering ignition in a cylinder of the engine;

(C) a monitor which monitors rotation of the rotational component;

(D) an electrically powered device which, when energized, triggers ignition in the cylinder; and (E) a computer which is coupled to the monitor and to the powered device and which is operable, in conjunction with the monitor and the powered device, to:

(1) detect rotation of an indicator marker past a designated location;

(2) determine an average velocity of the engine and if the average velocity does not exceed a threshold average velocity, then (3) detect rotation of the ignition triggering marker past a designated location; and (4) trigger ignition in the cylinder upon detecting the ignition triggering marker and without taking changes in engine velocity between the indicator marker and the ignition triggering marker into account.

22. The engine of claim 21 wherein the engine is a multi-cylinder engine having a plurality of ignition triggering markers on the rotational component, each of which designates a position on the rotational component that is acceptable for triggering ignition in a respective cylinder, and wherein the computer is further operable to repeat the detecting and triggering operations for each of the cylinders.

23. The engine of claim 22, wherein the engine has less than six cylinders.

24. The engine of claim 22, wherein the engine is a four cylinder engine.

25. The engine of claim 21, wherein the computer is further operable to (1) calculate engine velocity, (2) determine when the calculated engine velocity exceeds a threshold engine velocity, and (3) after determining that the calculated engine velocity exceeds the threshold engine velocity, change over to an ignition control scheme that takes calculated engine velocity into account.

26. The engine of claim 25, wherein an optimum rotational position of the rotational component for triggering ignition in the cylinder is located between a calculated ignition triggering marker and another indicator marker located downstream of the calculated ignition triggering marker in the direction of component rotation, and wherein the ignition control scheme is one which, for each cylinder, and upon detection of the calculated ignition triggering marker, (1) calculates an engine velocity at the calculated ignition triggering marker, (2) determines an ignition delay period based on the calculated engine velocity, and (3) triggers ignition upon expiration of the calculated ignition delay period.

27. The engine of claim 21, wherein the rotational component is a flywheel of the engine.

28. The engine of claim 21, wherein the engine is an outboard marine engine.

29. A two-stroke engine comprising;

(A) means for driving a rotational component of the engine to rotate, said component having a plurality of spaced indicator markers located thereon, wherein one of the markers is an ignition triggering marker that designates a position on the rotational component that is acceptable for triggering ignition in a cylinder of the engine;

(B) means for detecting rotation of an indicator marker upstream of the ignition triggering marker past a designated location;

(C) moans for determining if an average engine velocity is below a threshold velocity;

(D) means for detecting rotation of the ignition triggering marker past a designated location; and (E) means for triggering ignition in the cylinder upon detecting the ignition triggering marker without taking engine velocity changes into account between the indicator marker and the ignition triggering marker.

30. The engine of claim 29, wherein the engine is a multi-cylinder engine having a plurality of ignition triggering markers on the rotational component, each of which designates an acceptable ignition triggering location for a respective one of the cylinders, and further comprising means for repeating the detecting and triggering operations for each of the cylinders.

31. The engine of claim 29, further comprising (1) means for calculating engine velocity by monitoring rotation of the rotational component, (2) means for determining when a calculated engine velocity exceeds a threshold engine velocity, and (3) means for changing over to an ignition control scheme that takes calculated engine velocity into account after it is determined that the engine velocity exceeds the threshold engine velocity.

32. An engine control comprising:
   a sensor located in operational relation to a rotation component of an engine having a plurality of indicator markers thereon, wherein one of the plurality of indicator markers is an ignition triggering marker that designates a desired triggering point of ignition for a cylinder of the engine,
   an ECU connected to receiver signals from the sensor indicative of engine position and programmed to:
   (1) detect passage of an indicator marker;
   (2) determine an average engine velocity;
   (3) determine if the average engine velocity exceeds a threshold velocity, and if not
   (4) detect passage of the desired triggering point downstream of the indicator marker; and
   (5) trigger an ignition signal to the cylinder without taking into account changes in velocity of the engine during rotation between the indicator marker and the desired triggering point.

33. The engine control of claim 32 wherein the ECU is further programmed to determine engine rotational speed, and after the engine rotational speed exceeds a threshold speed, triggers the ignition signal based on the engine rotational speed.

34. The engine control of claim 33 wherein the ECU is further programmed to locate an optimum rotational position of the rotational component for triggering ignition in a desired cylinder of a multi-cylinder engine that is located between the desired triggering point and another indicator marker located downstream of the desired triggering point in a direction of component rotation, and wherein the engine control (1) calculates an engine velocity at the desired triggering point for each cylinder, (2) determines an ignition delay period based on the calculated engine velocity, and (3) triggers ignition upon expiration of the calculated ignition delay period.

35. The engine control of claim 32 incorporated into an outboard marine engine.

* * * * *

UNITED STATES PATENT AND TRADEMARK OFFICE
CERTIFICATE OF CORRECTION

PATENT NO.    : 6,505,595 B1
DATED         : January 14, 2003
INVENTOR(S)   : Koerner, Scott A.

It is certified that error appears in the above-identified patent and that said Letters Patent is hereby corrected as shown below:

Column 1,
Line 15, delete "modem" and substitute therefor -- modern --.

Column 7,
Line 65, delete "sing" and substitute therefor -- starting --.

Column 11,
Line 12, delete "rotation" and substitute therefor -- rotational --.

Signed and Sealed this

Tenth Day of June, 2003

JAMES E. ROGAN
*Director of the United States Patent and Trademark Office*